United States Patent
Lewin et al.

(10) Patent No.: US 11,025,593 B2
(45) Date of Patent: Jun. 1, 2021

(54) TEMPLATE-BASED SESSION CONTROL IN PROXY SOLUTIONS

(71) Applicant: Microsoft Technology Licensing, LLC, Redmond, WA (US)

(72) Inventors: Guy Lewin, Tel Aviv (IL); Tomer Cherni, Ganei Tikva (IL); Daniel Senderovich, Netanya (IL); Vitaly Khait, Yavne (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/457,168

(22) Filed: Jun. 28, 2019

(65) Prior Publication Data
US 2020/0412698 A1   Dec. 31, 2020

(51) Int. Cl.
| | |
|---|---|
| *H04L 29/06* | (2006.01) |
| *H04L 12/24* | (2006.01) |
| *H04L 12/813* | (2013.01) |
| *H04L 12/859* | (2013.01) |
| *H04L 12/851* | (2013.01) |
| *H04L 29/08* | (2006.01) |

(52) U.S. Cl.
CPC ......... *H04L 63/0281* (2013.01); *H04L 41/22* (2013.01); *H04L 47/20* (2013.01); *H04L 47/2475* (2013.01); *H04L 47/2483* (2013.01); *H04L 67/14* (2013.01)

(58) Field of Classification Search
None
See application file for complete search history.

(56) References Cited

U.S. PATENT DOCUMENTS

| | | | |
|---|---|---|---|
| 2007/0061282 A1* | 3/2007 | Ganguly | ............. H04L 67/1017 |
| 2012/0059878 A1* | 3/2012 | Hanstrom | ............. H04L 67/306 |
| | | | 709/203 |
| 2016/0088022 A1* | 3/2016 | Handa | ............. H04L 63/105 |
| | | | 726/1 |

FOREIGN PATENT DOCUMENTS

| | | |
|---|---|---|
| EP | 3076591 A1 | 10/2016 |
| WO | 2016048419 A1 | 3/2016 |

OTHER PUBLICATIONS

"International Search Report and Written Opinion Issued in PCT Application No. PCT/US20/031963", dated Jul. 23, 2020, 11 Pages.

* cited by examiner

*Primary Examiner* — Diane L Lo
(74) *Attorney, Agent, or Firm* — Dicke, Billig & Czaja, PLLC (57) ABSTRACT

A computer-implemented method includes receiving, by a reverse proxy device, a session control template, and a client request directed to a service provider regarding an application. The method includes determining, by the reverse proxy device, whether the client request should be allowed or blocked based on the received session control template. If the reverse proxy device determines that the client request should be allowed, the client request is forwarded from the reverse proxy device to the service provider. If the reverse proxy device determines that the client request should be blocked, the client request is blocked from proceeding to the service provider.

20 Claims, 4 Drawing Sheets

TEMPLATE-BASED SESSION CONTROL IN PROXY SOLUTIONS

BACKGROUND

Cloud-based applications are typically accessed by users using a client device via a web browser. Cloud-based applications include, among others, e-commerce applications, social media applications, enterprise applications, gaming applications, media sharing applications, storage applications, software development applications, and so on. Many individual users, businesses, and enterprises turn to cloud-based applications in lieu of "traditional" software applications that are locally installed and managed.

In networked computer systems, proxy services are sometimes used to monitor internet traffic and enforce policy restrictions on user activities. However, the policy rules may be predefined, and may not be customized for specific applications, such as line-of-business (LOB) applications.

It is with respect to these and other technical challenges that the disclosure made herein is presented.

SUMMARY

The disclosed technology provides a solution that permits a proxy service to monitor client requests to a server and apply policy rules and custom session control templates to the client requests. A reverse proxy service obtains policy data for received client requests that defines actions that are permitted or restricted. If the client request is permitted, the reverse proxy service may forward the client request to a service provider server. If the client request is prohibited, the reverse proxy service may block the client request. In some implementations, the reverse proxy server may notify the client that the client request is prohibited.

In some implementations, an administrator may use an administrator computing device to generate custom session control templates. The administrator computing device may execute an application (e.g., a browser application) that includes an integrated development environment (IDE) for creating and testing the custom session control templates. Each custom session control template may be application-specific, and may define prohibited user activities with respect to the application associated with the template. The templates may be deployed via the IDE to a forward proxy server, and tested by the administrator via the browser.

After a custom session control template has been created and tested by an administrator, the template may be applied to client requests. A client sends a client request to a forward proxy service, which determines whether any custom session control templates are applicable to the client request. If the forward proxy service identifies a custom session control template that is applicable to the client request, the forward proxy service forwards the identified template and the client request to a reverse proxy service. If the forward proxy service does not identify any custom session control templates that are applicable to the client request, the forward proxy service forwards the client request to the reverse proxy service, without an associated template.

The reverse proxy service receives the client request, as well as any applicable custom session control templates. The reverse proxy service parses any received template to determine whether the client request is permitted or not permitted by the template. The reverse proxy service may also obtain policy data and determine whether the client request is permitted or not permitted according to policy rules.

If the client request is permitted, the reverse proxy service may forward the client request to a service provider server. If the client request is prohibited, the reverse proxy service may block the client request. The reverse proxy service may send a message to the client indicating whether the client request is permitted or prohibited.

The disclosed technology involves receiving a client request and a custom session control template pertaining to the client request. The disclosed technology involves parsing the custom session control template, and searching for policy data pertaining to the client request. If the client request is not prohibited by the custom session control template or the policy data, then the client request is forwarded to a service provider server. If the client request is prohibited by the custom session control template or the policy data, then the client request is blocked from being sent to the service provider server.

Implementations of the technologies disclosed herein enable session control by a proxy service, including customized session control via application-specific templates, which leads to improved security. Other technical benefits not specifically identified herein can also be realized through implementations of the disclosed technologies.

It should be appreciated that the subject matter described herein can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 4 is a computer architecture diagram showing an illustrative computer hardware and software architecture for

DETAILED DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Session control by a proxy service may involve policy rules that are predefined, and are not customized for specific applications, such as line-of-business (LOB) applications. There are activities that are unique to each customer, and it would be inefficient to develop custom inspections at the proxy service for all such activities. It is more efficient to give the administrator for such customers control over custom activities, including the ability to configure the kind of traffic that the administrator thinks should be inspected, how it should be inspected, what actions will take place in case this traffic happens, and how the result will look.

The following detailed description is directed to an approach for session control by a reverse proxy service, including customized session control via session control templates. A client request from a client device is received by a forward proxy service. The forward proxy service forwards the client request and at least one custom session control template applicable to the client request to the reverse proxy service. The reverse proxy service checks the client request against rules specified in the custom session control template, and may also check the client request against stored policy data. If the reverse proxy service determines that the client request is permitted, the reverse proxy service forwards the client request to a service provider server. If the reverse proxy service determines that the client request is not permitted, the reverse proxy service blocks the client request from being sent to the service provider server.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

Figure 1:
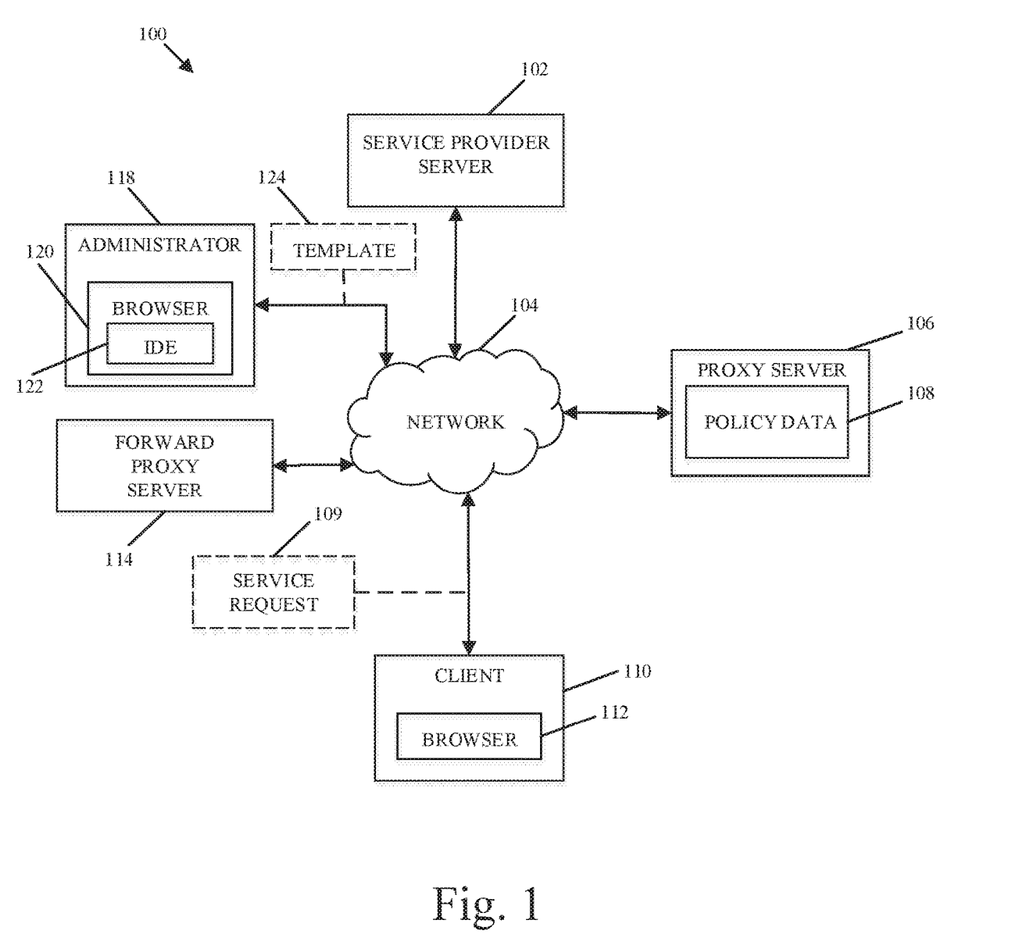
FIG. 1 is a network architecture diagram showing an illustrative example of a networked computing environment involving a client device, a service provider server, and a proxy service server, in accordance with one embodiment.

FIG. 1 is a network architecture diagram showing an illustrative example of a network computing environment 100, which includes a client computing device 110 in communication with a service provider server (e.g., web service provider) 102, and a reverse proxy service server 106, through network 104. Environment 100 also includes an administrator computing device 118 and a forward proxy server 114. Client computing device 110 may be a device, such as a personal computer or a smart phone, which a user utilizes to access resources through the network 104, such as services provided by service provider server 102, and can utilize a browser application 112 through a user interface of the client device 110.

Service provider server 102 supports services and content that can be accessed by client 110 through reverse proxy server 106 via network 104. When client 110 attempts to access services and content on server 102, the access is routed through reverse proxy server 106, which monitors the message traffic between client 110 and server 102.

Administrator computing device 118 executes a browser 120 with an IDE 122 for developing custom session control templates, such as template 124. The template 124 may be application-specific, and may define prohibited user activities with respect to the application associated with the template 124. The template 124 may be deployed via the IDE 122 to the forward proxy server 114, and tested by the administrator via the browser 120.

After a custom session control template 124 has been created and tested by an administrator, the template may be applied to client requests generated by client devices, such as client 110. For example, client 110 may send a service request 109 (e.g., a Universal Resource Locator (URL)) to server 102. Forward proxy server 114 receives the service request 109, and determines whether any custom session control templates 124 are applicable to the service request 109. If the forward proxy server 114 identifies a custom session control template 124 that is applicable to the service request 109, the forward proxy server 114 forwards the identified template 124 and the service request 109 to the reverse proxy server 106. The template 124 may be added as an HTTP request header. If the forward proxy server 114 does not identify any custom session control templates 124 that are applicable to the user action, the forward proxy server 114 forwards the service request 109 to the reverse proxy server 106 without an associated template 124.

The reverse proxy server 106 receives the service request 109 from the forward proxy server 114, as well as any custom session control templates 124 that are applicable to the service request 109. The reverse proxy server 106 parses any received template 124 to determine whether the service request 109 is permitted or not permitted by the template 124. The reverse proxy server 106 may also search policy data 108 for relevant policy rules that indicate whether the service request 109 is permitted or not permitted. The template 124 and the policy data 108 may include a variety of different policy rules to define which service requests are to be allowed, which service requests are to be blocked, and which service requests are to be monitored (e.g., logged into an event log).

The reverse proxy server 106 may allow the service request 109 to proceed to the service provider 102 if the reverse proxy server 106 determines that the service request 109 is permitted. If the reverse proxy server 106 determines that the service request 109 is not permitted, the reverse proxy server 106 may block the service request 109 from proceeding to the service provider 102. In certain implementations, the reverse proxy server 106 may provide a notification to the user of client device 110 indicating that the service request 109 is prohibited.

The IDE 122 allows an administrator to configure a custom session control template 124 in a particular template language, such as one based on JavaScript Object Notation (JSON). In some implementations, the custom session control templates may be used to provide deep content inspection of multiple protocols (e.g., JSON, form multi-part, etc.), and are not based only on request metadata (e.g., HTTP headers). The templates may be used for custom configuration of every control provided by the reverse proxy service 106. The IDE 122 allows an administrator to specify what to inspect within whatever network traffic the administrator desires to capture.

The IDE 122 allows an administrator to specify certain filters, such as filters that identify URLs that match a given expression, and allows an administrator to specify actions to take for different types of client requests. For example, the IDE 122 allows an administrator to specify that, for every client request that contains a given URL, parse the body of the request in a particular manner to obtain content to analyze, and then take certain actions based on the content (e.g., "if this parameter within the JSON contains the word 'password', then apply a block action"). As a more specific example, assume that "Facebook.com/API/send message" is the URL for sending a message in Facebook, and that an administrator has specified in a template 124 that, for every user request with a URL that matches "Facebook.com/API/send message", the proxy service should open the JSON in the body and look at the message field. If that message field contains the word "password", then the proxy service should block the requested user action, otherwise the proxy service should allow the requested user action. The template 124 may also specify further actions, such as returning an empty JSON if the message is blocked, and providing a notification to the user.

The IDE 122 helps an administrator to understand all of the possible features and options that the administrator can use in a template 124 for custom session control, and gives the administrator an immediate testing ability for their template 124 without affecting other users. After the template 124 has been tested, the administrator can use the IDE 122 to deploy the template 124 to work for all users in the organization. The use of custom session control templates 124 allows the system to not only provide a proxy service for applications that are known to the system, but for all applications, including custom LOB applications.

The disclosed technology provides an approach whereby a reverse proxy service can provide customized session control via templates. The disclosed technology may be implemented in the proxy service without generally requiring modifications to the client or service provider.

The architecture and messaging examples shown and described herein are illustrative and do not limit the scope of the disclosed technology. One of skill in the art will readily recognize that other architectures and message protocols may be utilized in keeping with the disclosed technology.

Figure 2:
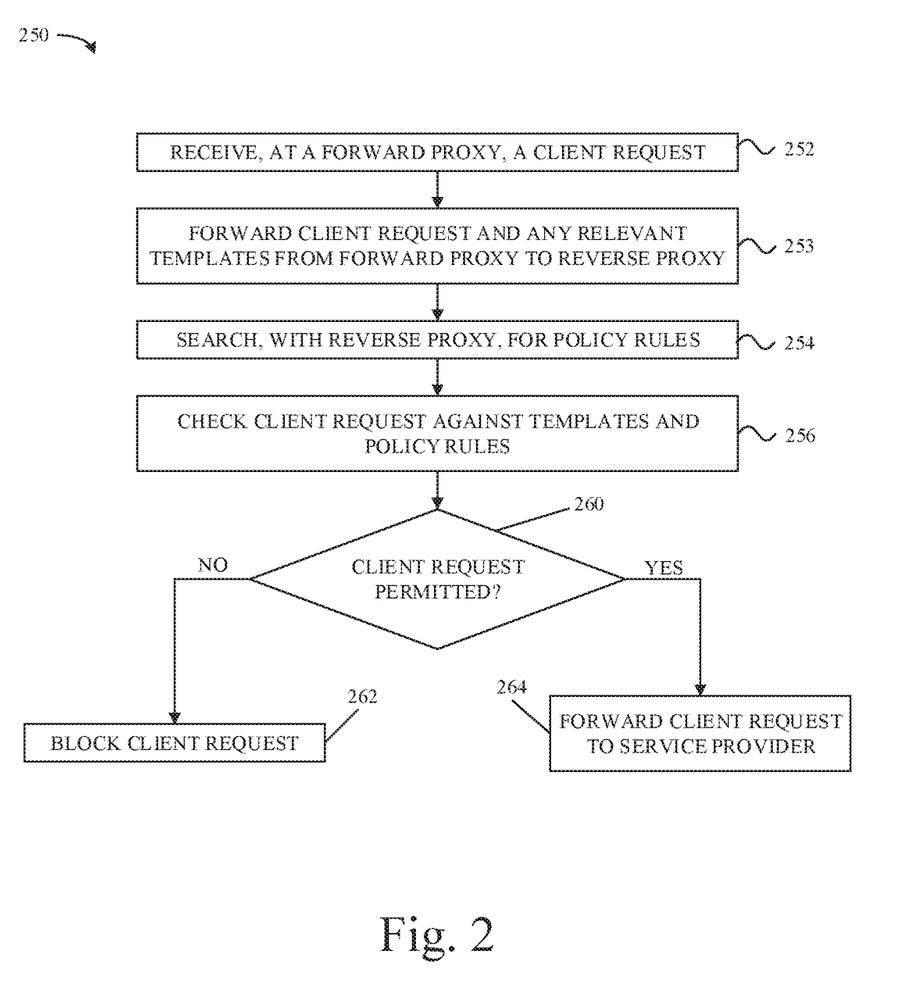
FIG. 2 is a flow diagram showing an illustrative example of a session control process in a proxy service in accordance with one embodiment.

FIG. 2 is a flow diagram showing an illustrative example of a process 250 in a forward proxy server and a reverse proxy server for performing custom session control according to one embodiment. The process shown assumes that a reverse proxy service server has been established with regard to a client to receive and relay communications between the client and a service provider.

In this example, process 250 applies custom session control templates and policy rules to client requests sent to a service provider server. At 252, the forward proxy server receives a client request from a client device. For example, the client request can be an HTTP request with a URL referencing content on a service provider.

At 253, the forward proxy server sends the client request and any custom session control templates that are applicable to the client request to the reverse proxy service server. At 254, the reverse proxy service server searches for policy rules based on the received client request. At 256, the reverse proxy service server checks the client request against policy rules and any custom session control templates sent at 253.

If the policy rules or the custom session control templates indicate that the client request is not permitted, control branches at 260 to 262 to block the client request. If the policy rules and the custom session control templates indicate that the client request is permitted, then control branches at 260 to 264 to forward the client request to the service provider server.

Figure 3:
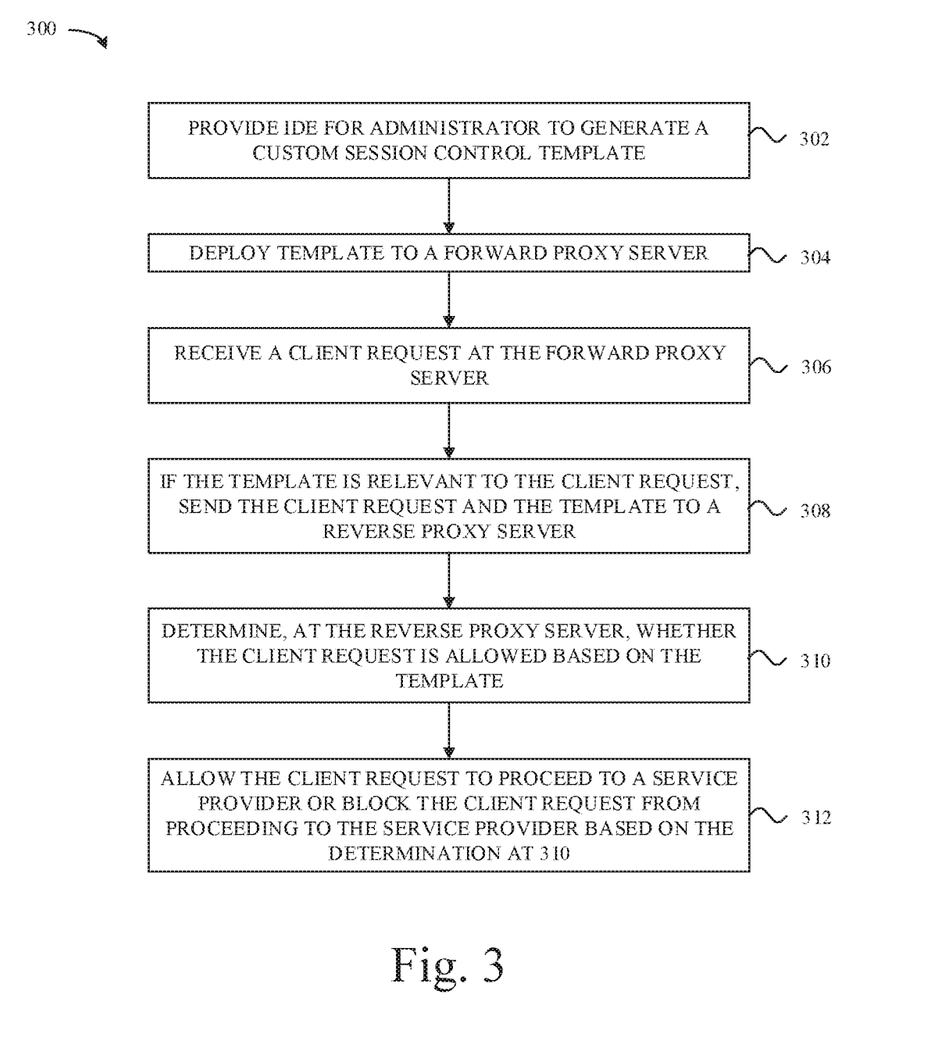
FIG. 3 is a flow diagram showing an illustrative example of a template-based session control process in accordance with one embodiment.

FIG. 3 is a flow diagram showing an illustrative example of a template-based session control process 300 in accordance with one embodiment. At 302 in process 300, an integrated development environment (IDE) is provided for an administrator to generate a custom session control template. At 304, the template is deployed to a forward proxy server. At 306, the forward proxy server receives a client request from a client device. At 308, if the template is relevant to the client request, the forward proxy server sends the client request and the template to a reverse proxy server. At 310, the reverse proxy server determines whether the client request is allowed based on the template. At 312, the reverse proxy server allows the client request to proceed to a service provider server or blocks the client request from proceeding to the service provider server based on the determination at 310.

One of skill in the art will readily appreciate that a variety of approaches may be utilized for session control in a proxy service without departing from the scope of the disclosed technology. The approach of the disclosed technology enables custom session control templates and policy rules to be applied to client requests, which improves the security and control of clients. It is to be appreciated that, while embodiments disclosed herein have been presented primarily in the context of performing session control in a reverse proxy service, the technologies disclosed herein can be similarly applied to other contexts where similar functionality is utilized to perform session control.

Figure 4:
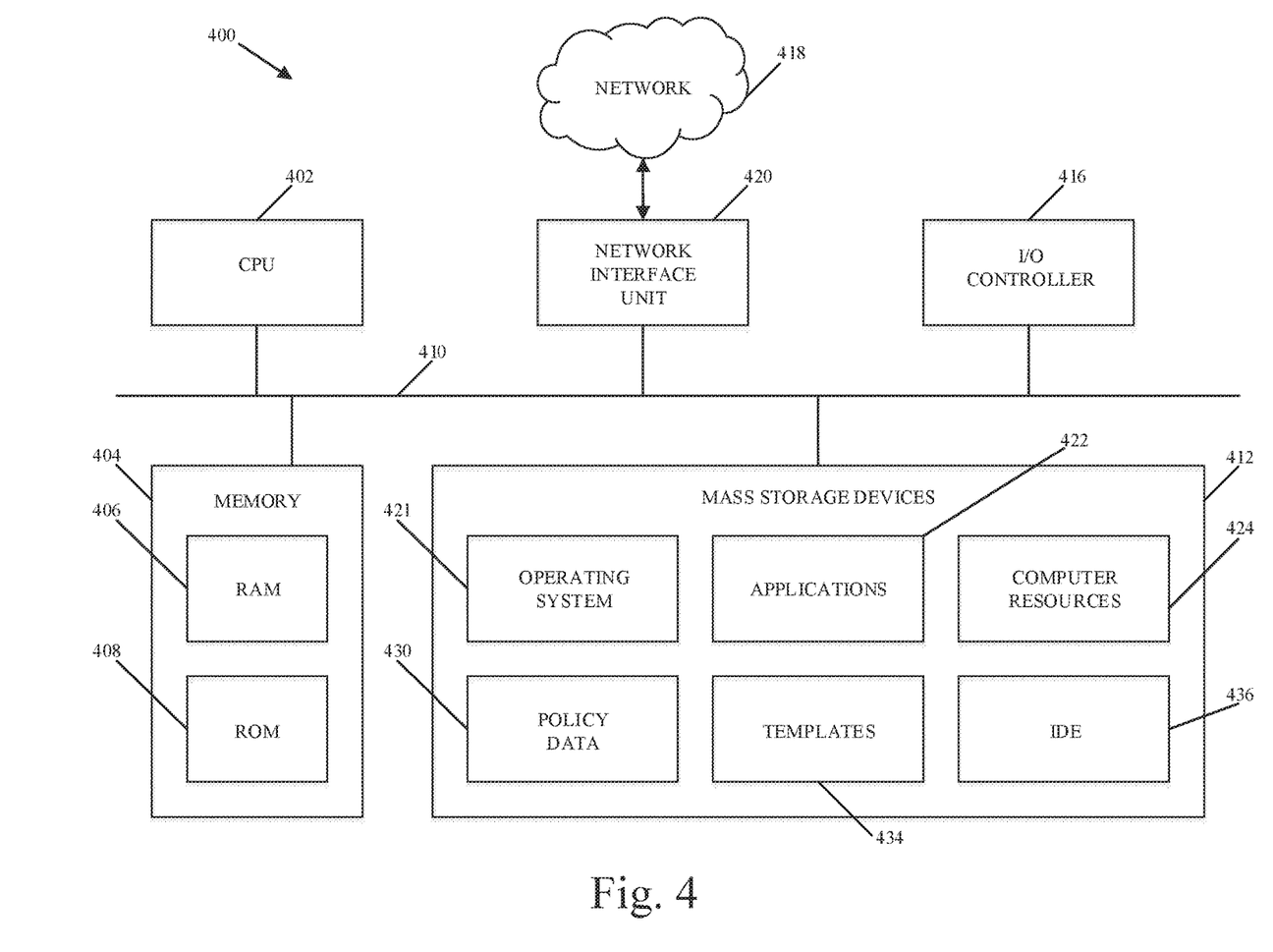

FIG. 4 is a computer architecture diagram that shows an architecture for a computer 400 capable of executing the software components described herein. The architecture illustrated in FIG. 4 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 400 shown in FIG. 4 can be utilized to implement a computing device capable of executing any of the software components presented herein. For example, and without limitation, the computing architecture described with reference to FIG. 4 can be utilized to implement the client 110, reverse proxy service server 106, service provider server 102, administrator computing device 118, and forward proxy server 114 illustrated in the system 100 of FIG. 1, which is capable of executing the various software components described above, such as the operations of the processes illustrated in FIGS. 2 and 3.

The computer 400 illustrated in FIG. 4 includes a central processing unit ("CPU") 402, a system memory 404, including a random-access memory ("RAM") 406 and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, may be stored in the ROM 408. The computer 400 further includes one or more mass storage devices 412 for storing an operating system 421, application programs 422, and other types of programs and data including, but not limited to, computer resources 424, policy data 430, custom session control templates 434, and integrated development environment (IDE) 436. The computer resources 424, policy data 430, templates 434, and IDE 436 can be stored in different storage devices from one another.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer storage medium," and variations thereof, does not include waves or signals per se or communication media.

According to various configurations, the computer 400 can operate in a networked environment using logical connections to remote computers through a network such as the network 418. The computer 400 can connect to the network 418 through a network interface unit 420 connected to the bus 410. It should be appreciated that the network interface unit 420 can also be utilized to connect to other types of networks and remote computer systems. The computer 400 can also include an input/output controller 416 for receiving and processing input from a number of other devices, including a keyboard, mouse, touch input, or electronic stylus (not shown in FIG. 4). Similarly, the input/output controller 416 can provide output to a display screen or other type of output device (also not shown in FIG. 4).

It should be appreciated that the software components described herein, when loaded into the CPU 402 and executed, can transform the CPU 402 and the overall computer 400 from a general-purpose computing device into a special-purpose computing device customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

One embodiment of the present disclosure is directed to a computer-implemented method, which includes receiving, by a reverse proxy device, a session control template, and a client request directed to a service provider regarding an application. The method includes determining, by the reverse proxy device, whether the client request should be allowed or blocked based on the received session control template. If the reverse proxy device determines that the client request should be allowed, the client request is forwarded from the reverse proxy device to the service provider. If the reverse proxy device determines that the client request should be blocked, the client request is blocked from proceeding to the service provider.

The method may also include sending, by a forward proxy device, the session control template to the reverse proxy device in response to the client request. The method may also include deploying the session control template to the forward proxy device using an integrated development environment on an administrator computing device.

The method may also include receiving, by a forward proxy device, the client request; determining, by the forward proxy device, whether the session control template is relevant to the client request; and sending, by the forward proxy device, the client request and the session control template to the reverse proxy device in response to a determination that the session control template is relevant to the client request. The method may also include sending, by the forward proxy device, the client request without the session control template to the reverse proxy device in response to a determination that the session control template is not relevant to the client request.

The method may also include determining, by the reverse proxy device, whether the client request should be allowed or blocked based on stored policy data. The method may also include sending, by the reverse proxy device, to the client device, a response indicating that the client request is not permitted.

The session control template in the method may be based on a JavaScript Object Notation (JSON) template language. The application in the method may be a line of business (LOB) application.

Another embodiment of the present disclosure is directed to a proxy system for session control. The system includes one or more processors; and one or more memory devices in communication with the one or more processors, the one or more memory devices having computer-readable instructions stored thereupon that, when executed by the processors, cause the processors to perform a method. The method includes receiving a session control template, and a client request directed to a service provider regarding an application; determining whether the client request should be allowed or blocked based on the received session control template; if it is determined that the client request should be allowed, forwarding the client request to the service provider; and if it is determined that the client request should be blocked, blocking the client request from proceeding to the service provider.

The method may further include receiving the session control template from a forward proxy device in response to the client request. The session control template may be created and deployed to the forward proxy device using an integrated development environment on an administrator computing device. The method may further include receiving, by a forward proxy device, the client request; determining, by the forward proxy device, whether the session control template is relevant to the client request; and forwarding, by the forward proxy device, the client request and the session control template in response to a determination that the session control template is relevant to the client request. The method may further include forwarding, by the forward proxy device, the client request without the session control template in response to a determination that the session control template is not relevant to the client request.

The method may further include determining whether the client request should be allowed or blocked based on stored policy data. The application in the method may be a line of business (LOB) application.

Yet another embodiment of the present disclosure is directed to one or more computer storage media having computer executable instructions stored thereon which, when executed by one or more processors, cause the processors to execute a method in a proxy service for session control. The method includes receiving a client request regarding an application that is directed to a service provider; receiving an application-specific session control template for the application, wherein the session control template is created and deployed from an integrated development environment on an administrator computing device; determining whether the client request should be allowed or blocked based on the received session control template; if it is determined that the client request should be allowed, forwarding the client request to the service provider; and if it is determined that the client request should be blocked, blocking the client request from proceeding to the service provider.

The method may further include receiving the session control template from a forward proxy device in response to the client request. The forward proxy device may determine whether the session control template is relevant to the client request, and send the session control template to a reverse proxy device in response to a determination that the session control template is relevant to the client request. The forward proxy device may forward the client request without the session control template to the reverse proxy device in response to a determination that the session control template is not relevant to the client request.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:
1. A computer-implemented method, comprising:
receiving, by a reverse proxy device from a forward proxy device, a session control template, and a client request directed to a service provider regarding an application;
determining, by the reverse proxy device, whether the client request should be allowed or blocked based on the received session control template;
if the reverse proxy device determines that the client request should be allowed, forwarding the client request from the reverse proxy device to the service provider; and
if the reverse proxy device determines that the client request should be blocked, blocking the client request from proceeding to the service provider.
2. The method of claim 1, and further comprising:
sending, by the forward proxy device, the session control template to the reverse proxy device in response to the client request.
3. The method of claim 2, and further comprising:
deploying the session control template to the forward proxy device using an integrated development environment (IDE) on an administrator computing device.

4. The method of claim 1, and further comprising:
receiving, by the forward proxy device, the client request;
determining, by the forward proxy device, whether the session control template is relevant to the client request; and
sending, by the forward proxy device, the client request and the session control template to the reverse proxy device in response to a determination that the session control template is relevant to the client request.

5. The method of claim 4, and further comprising:
sending, by the forward proxy device, the client request without the session control template to the reverse proxy device in response to a determination that the session control template is not relevant to the client request.

6. The method of claim 1, and further comprising:
determining, by the reverse proxy device, whether the client request should be allowed or blocked based on stored policy data.

7. The method of claim 1, and further comprising:
sending, by the reverse proxy device, to the client device, a response indicating that the client request is not permitted.

8. The method of claim 1, wherein the session control template is based on a JavaScript Object Notation (JSON) template language.

9. The method of claim 1, wherein the application is a line of business (LOB) application.

10. A proxy system for session control, the system comprising:
one or more processors; and
one or more memory devices in communication with the one or more processors, the one or more memory devices having computer-readable instructions stored thereupon that, when executed by the processors, cause the processors to perform a method comprising:
receiving, from a forward proxy device, a session control template, and a client request directed to a service provider regarding an application;
determining whether the client request should be allowed or blocked based on the received session control template;
if it is determined that the client request should be allowed, forwarding the client request to the service provider; and
if it is determined that the client request should be blocked, blocking the client request from proceeding to the service provider.

11. The proxy system of claim 10, wherein the method further comprises:
receiving the session control template from the forward proxy device in response to the client request.

12. The proxy system of claim 11, wherein the session control template is created and deployed to the forward proxy device using an integrated development environment on an administrator computing device.

13. The proxy system of claim 10, wherein the method further comprises:
receiving, by the forward proxy device, the client request;
determining, by the forward proxy device, whether the session control template is relevant to the client request; and
forwarding, by the forward proxy device, the client request and the session control template in response to a determination that the session control template is relevant to the client request.

14. The proxy system of claim 13, wherein the method further comprises:
forwarding, by the forward proxy device, the client request without the session control template in response to a determination that the session control template is not relevant to the client request.

15. The proxy system of claim 10, wherein the method further comprises:
determining whether the client request should be allowed or blocked based on stored policy data.

16. The proxy system of claim 10, wherein the application is a line of business (LOB) application.

17. One or more computer storage media, which is not a transitory propagating signal, having computer executable instructions stored thereon which, when executed by one or more processors, cause the processors to execute a method in a proxy service for session control, the method comprising:
receiving, from a forward proxy device, a client request regarding an application that is directed to a service provider;
receiving, from the forward proxy device, an application-specific session control template for the application, wherein the session control template is created and deployed to the forward proxy device from an integrated development environment on an administrator computing device;
determining whether the client request should be allowed or blocked based on the received session control template;
if it is determined that the client request should be allowed, forwarding the client request to the service provider; and
if it is determined that the client request should be blocked, blocking the client request from proceeding to the service provider.

18. The one or more computer storage media of claim 17, wherein the method further comprises:
receiving the session control template from the forward proxy device in response to the client request.

19. The one or more computer storage media of claim 18, wherein the forward proxy device determines whether the session control template is relevant to the client request, and sends the session control template to a reverse proxy device in response to a determination that the session control template is relevant to the client request.

20. The one or more computer storage media of claim 19, wherein the forward proxy device forwards the client request without the session control template to the reverse proxy device in response to a determination that the session control template is not relevant to the client request.

* * * * *